(12) United States Patent
Bothe et al.

(10) Patent No.: US 6,578,976 B2
(45) Date of Patent: Jun. 17, 2003

(54) LIGHTING DEVICE

(76) Inventors: Klaus Bothe, Münchener Strasse 1, 82057 Icking (DE), 82057; Reinhard Hiesinger, Memminger Strasse 42, 87742 Ottobeuren (DE), 87742; Kurt Mann, Rosenweg 15, 87748 Fellheim (DE), 87748

( * ) Notice: Subject to any disclaimer, the term of this patent is extended or adjusted under 35 U.S.C. 154(b) by 0 days.

(21) Appl. No.: 09/925,702

(22) Filed: Aug. 10, 2001

(65) Prior Publication Data

US 2002/0024804 A1 Feb. 28, 2002

(30) Foreign Application Priority Data

Aug. 18, 2000 (DE) .................................. 200 14 421 U

(51) Int. Cl.⁷ ................................................ F21V 7/04
(52) U.S. Cl. .............................. 362/31; 362/27; 362/16; 362/11
(58) Field of Search ............................... 362/31, 27, 11, 362/16, 17

(56) References Cited

U.S. PATENT DOCUMENTS

| 4,729,067 A | 3/1988 | Ohe | ........................... 362/26 |
| 4,985,809 A | * 1/1991 | Matsui et al. | .................. 362/31 |
| 5,371,656 A | * 12/1994 | Iorfida | ......................... 362/128 |
| 5,377,084 A | * 12/1994 | Kojima et al. | ................. 362/31 |
| 5,627,926 A | * 5/1997 | Nakamura et al. | .......... 349/112 |

FOREIGN PATENT DOCUMENTS

| CH | 658116 | 10/1986 |
| DE | 6931402 | 12/1969 |
| DE | 4121898 | 1/1992 |
| DE | 9204063 | 5/1993 |
| DE | 29707964 | 8/1997 |
| DE | 29823609 | 10/1999 |
| EP | 0719981 | 7/1996 |
| GB | 664193 | 1/1952 |
| JP | 11031407 | 2/1999 |

* cited by examiner

Primary Examiner—Sandra O'Shea
Assistant Examiner—Ali Alavi
(74) Attorney, Agent, or Firm—Jacobson Holman PLLC

(57) ABSTRACT

The invention relates to a lighting device for optical and photooptical or photographic purposes, which comprises an energy source, a light source and a housing in a transparent part with reflectors. A flash-lamp and/or normal lamp is provided laterally in said housing next to said transparent part.

18 Claims, 2 Drawing Sheets

Fig. 3
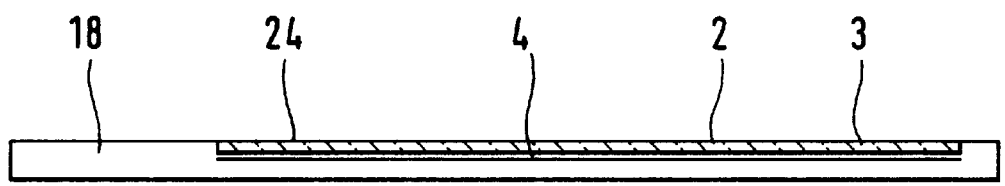
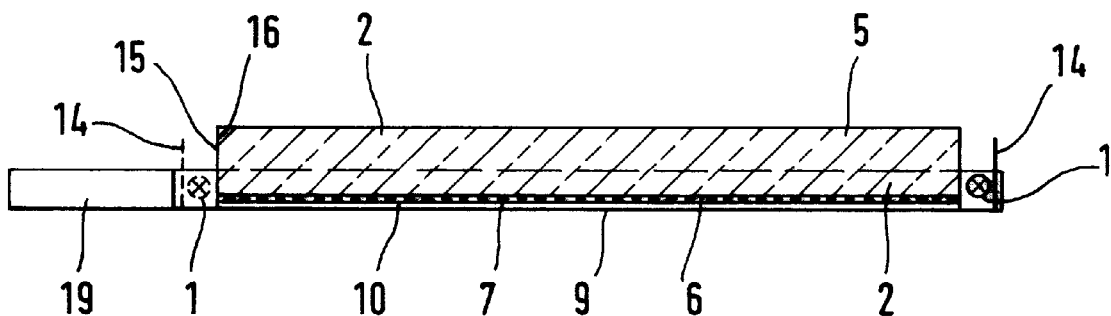
Fig. 2

LIGHTING DEVICE

BACKGROUND OF THE INVENTION

The invention relates to a lighting device for optical and photooptical or photographic purposes, which device comprises an energy source, a light source and a housing with a transparent part with reflectors.

Devices as described above are known for viewing translucent media, such as for example slides, negatives, X-ray pictures or the like. In the process, the medium is placed on a transparent part on the surface of the device, which surface is usually plane and viewed with the aid of the lighting source. The reflectors in the transparent part ensure a uniform distribution of the light, so a larger, illuminated area is produced on the surface of the transparent part. In the known lighting devices, the lighting source is located behind the transparent part, reflectors being arranged on the side remote from the transparent part to reflect to the front the light radiated to the back. This results in relatively large or deep devices which are correspondingly unwieldy.

Devices of this type are, depending on size, transportable or rigidly integrated, for example into a table or a wall.

Light sources or lighting devices which should fully illuminate the object to be photographed, as far as possible without shadows, are used in photographic studios. Screen-like lighting devices are known for this purpose in which a lighting source is arranged in a focal point of a parabolic screen and the light is dispersed over as large an area as possible. These known lighting devices are also very bulky and cannot usually be placed close to the article to be photographed.

It is an object of the invention to provide an improved device of the type described above, in that it can be used for various applications and, in particular, is suitable for two-dimensional illumination when photographing.

BRIEF SUMMARY OF THE INVENTION

To achieve this object, the invention starts from a lighting device as described above and proposes that, as a lighting source, a laterally arranged flash-lamp and/or normal lamp is provided which is arranged laterally in said housing next to said transparent part.

By virtue of the proposal according to the invention, a lighting device is produced which can be relatively narrow in design. It is therefore possible to use this device even in restricted spaces. It is also possible for said device to be relatively small in design, a plurality of said devices, for example, then being placed around the object to be illuminated to achieve optimum illumination of said article. The proposed design allows very compact construction of said illuminating device. As the illuminating devices according to the invention can be positioned relatively close to the objects to be illuminated (outside the visual range of the lens system, of course), it is also possible to work with smaller lighting sources, as not too much light disappears due to diffusion because of a large distance between said lighting source and said article to be illuminated. Adequate light intensity is nevertheless provided on the object to be illuminated. This also contributes to said lighting device being relatively small and neat in design, which significantly increases the range of application.

By using a flash-lamp in addition to, or in place of, a normal lamp, the lighting device can be used as a flash device, allowing illumination even of larger spaces due to the extensive distribution of the light. This significantly increases the versatility of said device.

In a preferred embodiment of the invention, said transparent part comprises a milk glass sheet, a parchment-like film and a transparent sheet, which preferably comprises plastics material. Said milk glass sheet or said parchment-like film allow a distribution of the light in the area of said transparent part which is as uniform as possible. It is the aim of said lighting device to produce a light intensity which is distributed as homogeneously and uniformly as possible over the area. The design of said transparent part contributes to this.

The transparent part is preferably substantially rectangular or square. This accords with the application as a viewing device for slides, X-ray pictures or the like. This shape has also proved successful for flat flash devices, as a radiation range which is as large as possible is thus produced.

For better distribution of the light, in a preferred embodiment of the invention reflective points are arranged on the underside of said transparent sheet, said reflective points forming a fine-meshed grid. The fact that the illumination does not appear close to the light source or the light sources means that optimum distribution of the light over the whole area of said transparent part is achieved and ensured. Said reflective points can be applied, for example, by screen printing, other processes also being conceivable. Additional reflective materials are not necessary in said reflective points.

It is also favourable if a reflective film is provided between the back wall of said housing and said reflective points. This reflective film is preferably held in a white plastics material and extends over the whole of the back of said transparent part.

Instead of the white paint or the white film for reflective points and reflective film, metallic or partially metallic material can also be used.

In the preferred embodiment of the invention, one or more flash-lamps and/or one or more normal lamps are arranged on one or more sides of said substantially rectangular or square, transparent parts, and the light produced by said light sources is enclosed in the lateral edge of said transparent sheet and owing to the reflection means arranged on the back of said sheet is radiated forwards.

Owing to the optional use of flash-lamps or normal lamps, if both lamps are built into the device, the lighting device can be used for a plurality of purposes by means of an appropriate circuit. For example, the flash-lamps can be arranged on two opposing sides of said square and the normal lamps on the two other opposing sides of said square. A corner arrangement is also possible. The light produced by the lighting sources falls laterally onto said transparent sheet and is reflected back by said reflective points or by the reflective film on the back of said sheet. Uniform distribution is achieved, on the one hand, by said parchment-like film and, on the other hand, by said covering milk glass sheet. It is achieved, owing to this arrangement that the light intensity is not substantially increased in comparison to the rest of the area, even at the side where the lamp is.

A better distribution of the light can also be achieved owing to a corresponding arrangement of the reflective points on the back.

To this end, it is favourable if the light source or the light sources are rod-shaped in design. A light rod of this type can include the whole side or edge of said transparent sheet, but a plurality of rod-shaped light sources can also be provided on one side. Both a normal lamp and a flash-lamp can, for example, be arranged on one side.

To increase the light output, reflectors can be arranged behind the light source. These reflectors are also a film or the like, which preferably consists of white material. Mirror-like metal films and similar can also be used here. The reflectors behind said light source shut off said light source as far as possible on all of the three sides which do not face the edge of said transparent sheet.

It has proved favourable where lamps are not provided on all of the edges of the plastic sheet, if light-proof seals or reflective layers are arranged on these edges. These layers reflect back the light and thus increase the light output. This also achieves a more uniform light distribution.

Owing to the cooperation of the various seals, reflective points and reflective films, an exceptionally uniform light distribution is achieved. The result is, in the case of the normal lamp, a uniformly illuminated milk glass sheet, which is excellent for viewing even awkward details on slides and the like. When flash-lamps are used, a extensive light emittance is achieved, which flash-lamps illuminate the object to be photographed very well and in comparison with conventional very small flash-lamps allow good photographs.

A further advantage of the device is that the thickness of the device is some mm to a few cm, and the housing is very narrow in relation to a side measurement of the housing. The thickness of said device forms an approximate ratio with the side measurement of said housing of a maximum of 1:5 to 1:10 (in small devices), and in large devices also a maximum of 1:20. This means that the result is a very flat device which is extremely easy to handle both in studio operation and in mobile operation. It is easy to accommodate and also correspondingly simple to combine with cameras and other photographic devices. The relatively narrow device is also ideally suited as a table-top device for viewing slides.

It is also favourable if a coupling is provided on the housing which corresponds to a tripod coupling. Couplings of this type are generally known and standardised, so that the device can be combined with any commercial tripod or also a camera.

In a preferred embodiment of the invention, a connection with an appropriate circuit is provided between the lighting device and a photooptical device, for example a camera. This circuit is used, in particular, if the device is to be used as a flashlight, so that the flash illuminates simultaneously when the camera is triggered. A circuit of this type can be integrated, for example, in the device.

Batteries or accumulators are preferably integrated into the device for the energy supply, but a connection can also be provided to an external power source. The variant with integrated batteries or accumulators is particularly suitable for mobile operation, while an external power source, for example a plug socket with a corresponding transformer, is suitable for studio operation.

BRIEF DESCRIPTION OF THE SEVERAL VIEWS OF THE DRAWINGS

An embodiment according to the invention of a lighting device is shown schematically in the drawings, in which:

FIG. 2 is a section through the opened lighting device according to the invention according to the section line II–II in FIG. 1, and FIG. 3 is a section through the top of the device according to the invention.

DETAILED DESCRIPTION

Figure 1:
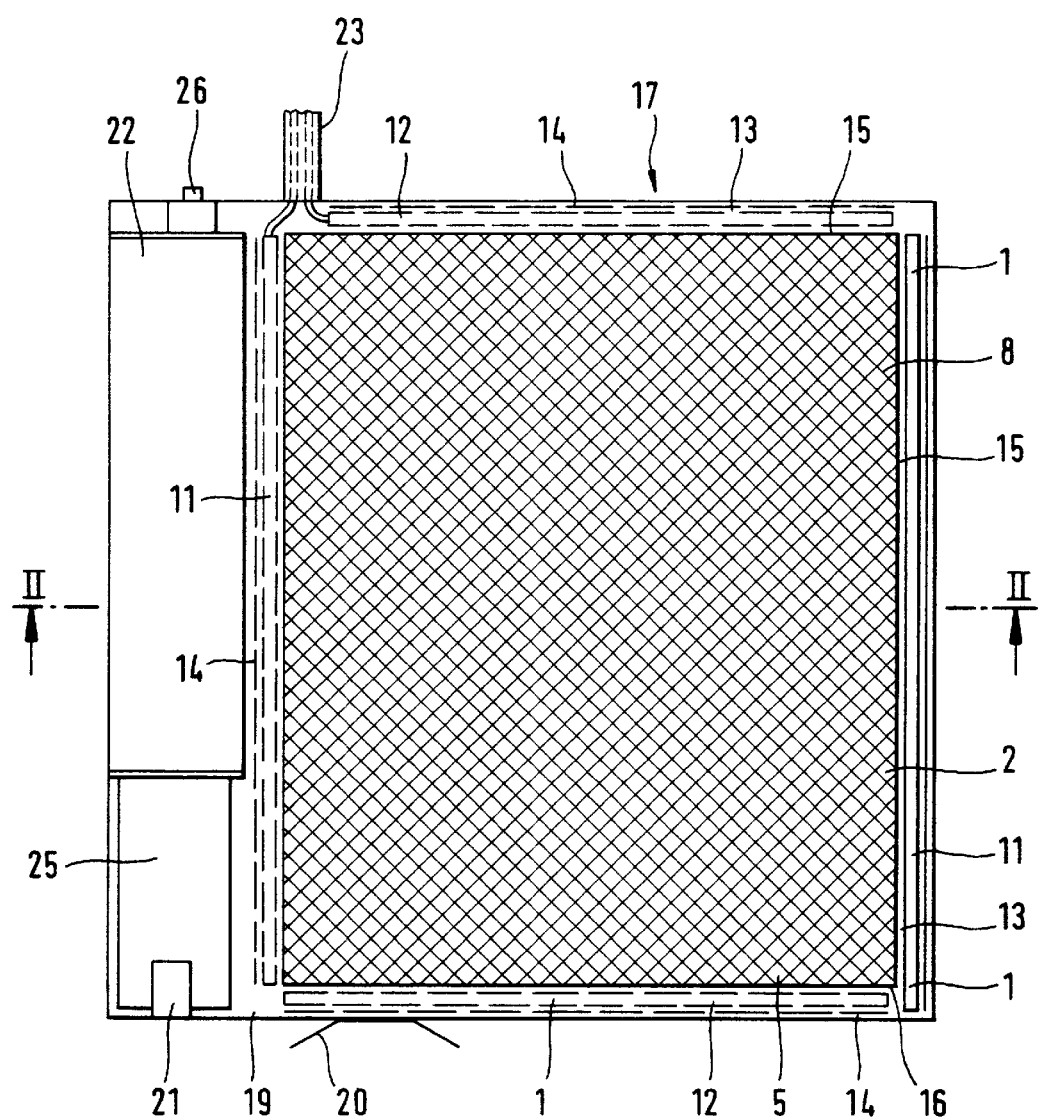
FIG. 1 is a plan view of an opened lighting device according to the invention.

The plan view of the device 17, as shown in FIG. 1, shows that the device 17 is substantially rectangular or even square. The largest part of the device 17 is thus taken up by the transparent part 2 around which flash-lamps 11 or normal lamps 12 are arranged. FIG. 1 shows, for example, an arrangement where flash-lamps 11 are arranged on two opposing sides 13, while the two other opposing sides have normal lamps 12. If lamps are provided on all the sides of the transparent part 2, the seals 16 which are otherwise arranged laterally on the edges 15 of the transparent sheet 5, are dispensed with. The seals 16 are provided on the edges which have no light sources 1 consisting of flash-lamps 11 or normal lamps 12.

The transparent part 2 consists of the milk glass sheet 3, the surface 24 of which, for example, forms the supporting face for slides and the like, the foil 4, which consists, for example, of parchment paper, the sheet 5, which is, for example, a plastic or plexiglass sheet and which is provided with reflective points 7 on its underside 6. The transparent part 2 is closed off towards the back wall of the housing 9 by a reflective film 10. The reflective film 10 and reflective points 7 which are applied in a fine-meshed grid 8, for example by screen printing, onto the sheet 5, preferably consist of white paint or white film, like the reflectors 14 which are arranged on the side 13 behind the light source 1 and prevent light emittance to the outside. In the process, the reflectors 14 cover the light source 1 which is preferably rod-shaped, on three sides, so only the side facing in the direction of the transparent part 2 remains uncovered. The light output is therefore increased.

The housing itself consists of an upper housing part 18 and a lower housing part 19, the milk glass sheet 3 being integrated into the upper housing part 18.

The lower housing part 19 has at the side the energy source 22 which is, for example, batteries or accumulators. A connection 21 can also be provided to an external energy source.

A connection 23, for example in the form of a cable is also provided which is combined with a corresponding circuit 25 and is coupled to a photooptical device, for example a camera. Owing to this circuit, the flash is simultaneously triggered with the triggering of the camera, as is already known.

The housing 18, 19 is also equipped with an on/off switch 2 which is accessible from outside and supplies the light source 1 with energy, A coupling 20 is also provided outside on the device 17 which consists, for example, of clamping strips with threaded nuts and can be mounted on known tripods. This increases the practicability of the device.

The claims filed now with the application and later are attempts at formulation without prejudice to the obtaining of more extensive protection.

The references made in the dependent claims refer to the further development of the subject of the main claim by the features of the respective sub-claim. However, these should not be understood as a renunciation of obtaining an independent subject protection for the features of the sub-claims referred to, Features which were previously only disclosed in the description can be claimed in the course of the proceedings as being of significance essential to the invention, for example, delimitation from the state of the art.

What is claimed is:

1. A lighting device for optical and photooptical or photographic purposes, comprising an energy source, a housing having a transparent part with reflectors, at least one lighting source having at least one flash-lamp arranged laterally in said housing next to said transparent part, and said transparent part consists of a glass sheet, a parchment-like film and a clear sheet, preferably made of plastics material, and reflective points are arranged on an underside of the transparent sheet.

2. A lighting device for optical and photooptical or photographic purposes, comprising an energy source, a housing having a transparent part with reflectors, at least one lighting source having at least one normal lamp arranged laterally in said housing next to said transparent part, and said transparent part consists of a glass sheet, a parchment-like film and a clear sheet, preferably made of plastics material, and reflective points are arranged on an underside of the transparent sheet.

3. The lighting device according to claim 1, wherein said transparent part is substantially rectangular or square.

4. A lighting device for optical and photooptical or photographic purposes, comprising an energy source, a housing in a transparent part with reflectors, at least one lighting source having at least one flash-lamp and at least one normal lamp arranged laterally in said housing next to said transparent part, and said transparent part consists of a glass sheet, a parchment-like film and a clear sheet, preferably made of plastics material, and reflective points are arranged on an underside of the transparent sheet.

5. The lighting device according to claim 1, wherein said reflective points form a finely-meshed grid.

6. The lighting device according to claim 1, wherein said reflective points consist of white paint.

7. The lighting device according to claim 1, wherein a reflective film is provided between the back wall of said housing and said reflective points.

8. The lighting device according to claim 1, wherein said at least one flash-lamp is arranged on at least one side of said transparent part and the light produced by said at least one lighting source is enclosed in the lateral edge of said transparent sheet and is radiated forward by said reflective points arranged on the back of said sheet.

9. The lighting device according to claim 1, wherein said at least one lighting source is preferably rod-shaped in design.

10. The lighting device according to claim 1, wherein reflectors are arranged behind said at least one lighting source.

11. The lighting device according to claim 1, wherein light-proof seals or reflection coatings are arranged on the edges of the plastic sheet which is not taken up by lamps.

12. The lighting device according to claim 1, wherein a thickness of said device is some mm to a few cm and said housing is narrow in relation to a side measurement of said housing.

13. The lighting device according to claim 1, wherein a coupling is provided on said housing.

14. The lighting device according to claim 1, wherein a connection with corresponding circuit is provided between the lighting device and a photooptical device.

15. The lighting device according to claim 1, wherein said energy source is integrated into said housing.

16. The lighting device according to claim 1, wherein a connection is provided to an external energy source.

17. The lighting device according to claim 2, wherein said at least one normal lamp is arranged on at least one side of said transparent part and the light produced by said at least one lighting source is enclosed in the lateral edge of said transparent sheet and is radiated forward by said reflective points arranged on the back of said sheet.

18. The lighting device according to claim 4, wherein said at least one flash-lamp and at least one normal lamp are arranged on at least one side of side of said transparent part and the light produced by these lighting sources is enclosed in the lateral edge of said transparent sheet and is radiated forward by said reflective points arranged on the back of said sheet.

* * * * *